US012654572B2

(12) United States Patent
Bessho et al.

(10) Patent No.: US 12,654,572 B2
(45) Date of Patent: Jun. 16, 2026

(54) WORK VEHICLE WITH DETACHABLE BATTERY

(71) Applicant: Kubota Corporation, Osaka (JP)

(72) Inventors: Hiroki Bessho, Sakai (JP); Shotaro Ikemoto, Sakai (JP)

(73) Assignee: Kubota Corporation, Osaka (JP)

( * ) Notice: Subject to any disclaimer, the term of this patent is extended or adjusted under 35 U.S.C. 154(b) by 273 days.

(21) Appl. No.: 18/388,647

(22) Filed: Nov. 10, 2023

(65) Prior Publication Data

US 2024/0157818 A1    May 16, 2024

(30) Foreign Application Priority Data

Nov. 11, 2022    (JP) ................................. 2022-181288

(51) Int. Cl.
B60L 50/60            (2019.01)

(52) U.S. Cl.
CPC ........... B60L 50/66 (2019.02); B60L 2200/40 (2013.01)

(58) Field of Classification Search
CPC ............................ B60L 50/66; B60L 2200/40
See application file for complete search history.

(56) References Cited

U.S. PATENT DOCUMENTS

| | | | |
|---|---|---|---|
| 2012/0226405 A1 | 9/2012 | Gillingham et al. | |
| 2015/0274013 A1 | 10/2015 | Matsuda et al. | |
| 2017/0174069 A1* | 6/2017 | Oyama | B60R 21/131 |
| 2020/0189379 A1* | 6/2020 | Hirukawa | B62D 23/005 |
| 2024/0157775 A1* | 5/2024 | Bessho | B60K 1/00 |

FOREIGN PATENT DOCUMENTS

| | | |
|---|---|---|
| JP | 2013141875 A | 7/2013 |
| WO | 2014057514 A1 | 4/2014 |
| WO | 2019044291 A1 | 3/2019 |

* cited by examiner

*Primary Examiner* — Edwin A Young
(74) *Attorney, Agent, or Firm* — The Webb Law Firm

(57)            ABSTRACT

A work vehicle according to the present invention includes a driver section 4 including a seat 6, 7; a battery support section 32 in which the battery 42 is mountable and from which the battery is removable, wherein moving the battery 42 from left or right of the battery support section 32 in a left-right direction A1 allows the battery 42 to be mounted in the battery support section 32, and moving the battery 42 from the battery support section 32 to the left or right of the battery support section 32 in the left-right direction A1 allows the battery 42 to be removed from the battery support section 32.

9 Claims, 5 Drawing Sheets

WORK VEHICLE WITH DETACHABLE BATTERY

CROSS-REFERENCE TO RELATED APPLICATION

This application claims priority to Japanese Patent Application No. 2022-181288 filed Nov. 11, 2022, the disclosure of which is hereby incorporated by reference in its entirety.

BACKGROUND OF THE INVENTION

Field of the Invention

The present invention relates to an electrically operated work vehicle including a motor configured to drive its travel device and a hybrid work vehicle including an engine and a motor each configured to drive its travel device.

Description of Related Art

Japanese Unexamined Patent Application Publication, Tokukai, No. 2013-141875 discloses an electrically operated work vehicle as an example. The work vehicle includes a transmission case, a motor, and a battery. The transmission case for storing a travel transmission device is at a back portion of the work vehicle. The motor is coupled to a front portion of the transmission case. The battery is at a front portion of the work vehicle, and is a little higher in position than the front wheels (travel device).

SUMMARY OF THE INVENTION

The use of an electrically operated or hybrid work vehicle involves detaching and attaching a battery in maintaining the battery or replacing an exhausted battery with a charged one. An electrically operated or hybrid work vehicle uses a large and heavy battery, and should allow a worker to easily attach and detach the battery to reduce the burden on the worker.

The present invention has an object of providing an electrically operated or hybrid work vehicle that allows a worker to easily attach and detach a battery.

A work vehicle of the present invention includes: at least one travel device; a driver section including a seat; a battery; a motor configured to supply motive power to the at least one travel device with use of electric power from the battery; and a battery support section in which the battery is mountable and from which the battery is removable, wherein moving the battery from left or right of the battery support section in a left-right direction allows the battery to be mounted in the battery support section, and moving the battery from the battery support section to the left or right of the battery support section in the left-right direction allows the battery to be removed from the battery support section.

The present invention allows a worker to, in mounting a battery in the battery support section, move the battery leftward (or rightward) from the right (or left) of the battery support section in the left-right direction into the battery support section to mount the battery in the battery support section.

The present invention also allows a worker to, in removing the battery from the battery support section, move the battery rightward (or leftward) from the battery support section in the left-right direction to the right (or left) of the battery support section to remove the battery from the battery support section.

In contrast, mounting a battery in the battery support section from above or removing a battery from the battery support section from above would require a crane to lift the battery. Mounting a battery in the battery support section from below or removing a battery from the battery support section from below would require a jack to lift the work vehicle.

The present invention allows a worker to move a battery into and out of the work vehicle in the left-right direction to easily mount and remove the battery.

A cart or the like with a height substantially equal to the battery support section will allow the worker to move the battery easily, as the worker can place the battery on the cart. The present invention eliminates the need for a crane for lifting the battery or a jack for lifting the work vehicle.

If a worker should move a battery into or out of a work vehicle in the front-back direction to mount or remove the battery, the worker would need to move the battery over a long distance, as typical work vehicles are larger in the front-back dimension than in the left-right dimension.

The present invention allows a worker to move a battery into and out of the work vehicle in the left-right direction to mount and remove the battery. The worker thus only needs to move the battery over a short distance, as typical work vehicles are smaller in the left-right dimension than in the front-back dimension.

The present invention, as described above, eliminates the need for a crane for lifting a battery or a jack for lifting the work vehicle, and allows a worker to only move a battery over a short distance in the left-right direction. This in turn allows the worker to easily mount and remove the battery, and thereby allows the worker to maintain the work vehicle easily.

The work vehicle may preferably be further configured such that the at least one travel device includes a front travel device and a rear travel device, the driver section is between the front travel device and the rear travel device in a side view, and the battery support section is between the driver section and the rear travel device in a side view.

With the above configuration, the heavy battery is between the front and rear travel devices, and is proximate to the front-back center of the work vehicle. This improves the travel stability and handling of the work vehicle. Further, the battery is backward of the driver section, and does not block the forward visibility from the driver section.

The work vehicle may preferably be further configured such that the motor is between the driver section and the rear travel device in a side view, and the battery support section is between the driver section and the motor in a side view.

With the above configuration, the heavy battery and motor are between the front and rear travel devices, and are proximate to the front-back center of the work vehicle. This is advantageous in terms of the travel stability and handling of the work vehicle.

With the above configuration, the motor is backward of the battery and proximate to the rear travel device. This is advantageous in terms of downsizing the system of power transmission from the motor to the rear travel device.

The work vehicle may preferably be further configured such that the battery support section is below the seat.

With the above configuration, the heavy battery is at a low position in the work vehicle. This is advantageous in terms of the travel stability and handling of the work vehicle.

The work vehicle may preferably further include: a body frame for which the at least one travel device is provided and which supports the driver section, wherein the body frame includes: a first frame member under the driver section; a second frame member extending upward from a back portion of the first frame member and disposed backward of the driver section; and a third frame member extending backward from an upper portion of the second frame member, and the battery support section is backward of the second frame member and below the third frame member.

With the above configuration, the travel device is provided for the body frame of the work vehicle, and the driver section is supported by the body frame. The body frame includes a first frame member, a second frame member, and a third frame member.

With the above configuration, the battery support section is backward of the second frame member and below the third frame member. The battery support section thus utilizes the corner space between the second frame member and the third frame member.

The work vehicle may preferably be further configured such that the battery support section includes: a support base coupled to a back portion of the first frame member or to the second frame member and extending backward, to which support base the battery is attachable; and a support frame member coupled to the third frame member and the support base.

The above configuration provides a space defined in a side view by (i) the second frame member, which extends in the up-down direction, (ii) the horizontal third frame member, (iii) the horizontal support base, and (iv) the support frame member, which extends in the up-down direction. The space is a battery support section in which the battery is easily mountable.

The work vehicle may preferably further include: a carrier box over the third frame member.

Typical work vehicles include a carrier box at a back portion of the body frame.

With the above configuration, the carrier box is over the third frame member, and the battery support section is below the third frame member. As a worker moves the battery into and out of the work vehicle in the left-right direction to mount and remove the battery, the carrier box does not obstruct the mounting and removal of the battery.

The work vehicle may preferably further include: a suspension link held by a back portion of the first frame member or a lower portion of the second frame member in a vertically swingable manner and extending backward below the battery support section in a side view; and a suspension mechanism backward of the battery support section and coupled to the third frame member and the suspension link, wherein the rear travel device is held by a back portion of the suspension link.

With the above configuration, the suspension link and suspension mechanism allow the rear travel device to be held by the body frame. The suspension link extends backward below the battery support section. The suspension mechanism is backward of the battery support section.

While a worker mounts and removes the battery, the suspension link and the suspension mechanism do not likely obstruct the movement of the battery in the left-right direction. This allows the worker to easily mount and remove the battery. The work vehicle is thus advantageously easier to maintain.

The work vehicle may preferably be further configured such that the battery is in a shape of a rectangle with a long side and a short side in a plan view, and the battery is mountable in the battery support section with the long side in the left-right direction.

With the above configuration, the battery is mounted in the battery support section with the long side in the left-right direction.

In mounting a battery in the battery support section, a worker can smoothly move the battery leftward (or rightward) from the right (or left) of the battery support section in the left-right direction into the battery support section with the long side in the left-right direction to easily mount the battery in the battery support section.

In removing the battery from the battery support section, a worker can move the battery leftward (or rightward) from the battery support section with the battery oriented as when mounted in the battery support section (that is, with the long side in the left-right direction) to easily remove the battery from the battery support section.

The above configuration allows the worker to easily mount and remove the battery. The work vehicle is thus advantageously easier to maintain.

DESCRIPTION OF THE INVENTION

FIGS. 1 to 5 illustrate an electrically operated utility work vehicle as an example work vehicle. FIGS. 1 to 5 show arrow F to indicate the forward direction, arrow B to indicate the backward direction, arrow U to indicate the upward direction, arrow D to indicate the downward direction, arrow L to indicate the leftward direction, and arrow R to indicate the rightward direction.

Overall Configuration of Work Vehicle

Figure 1:
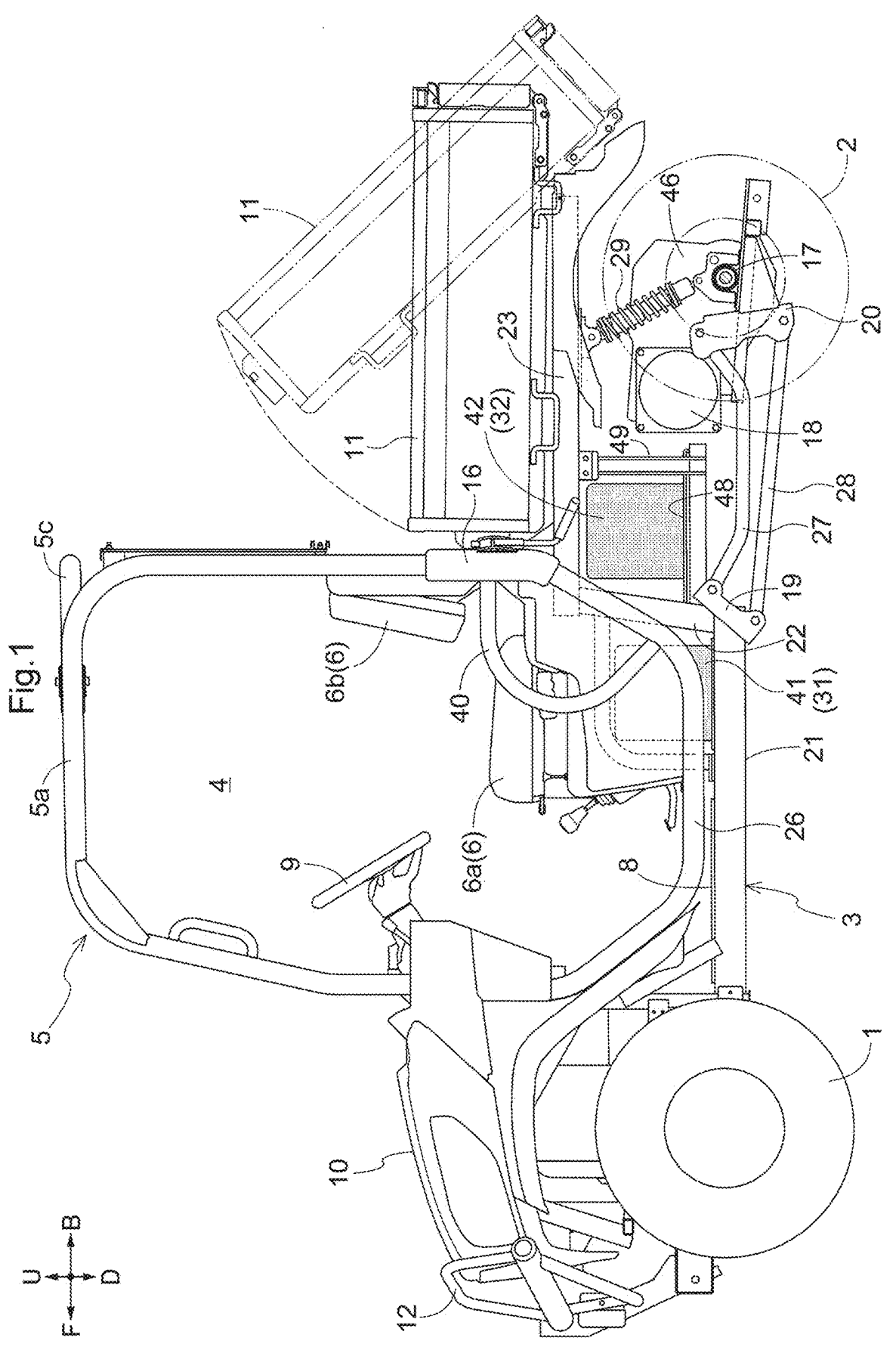
FIG. 1 is a left side view of a work vehicle.
Figure 2:
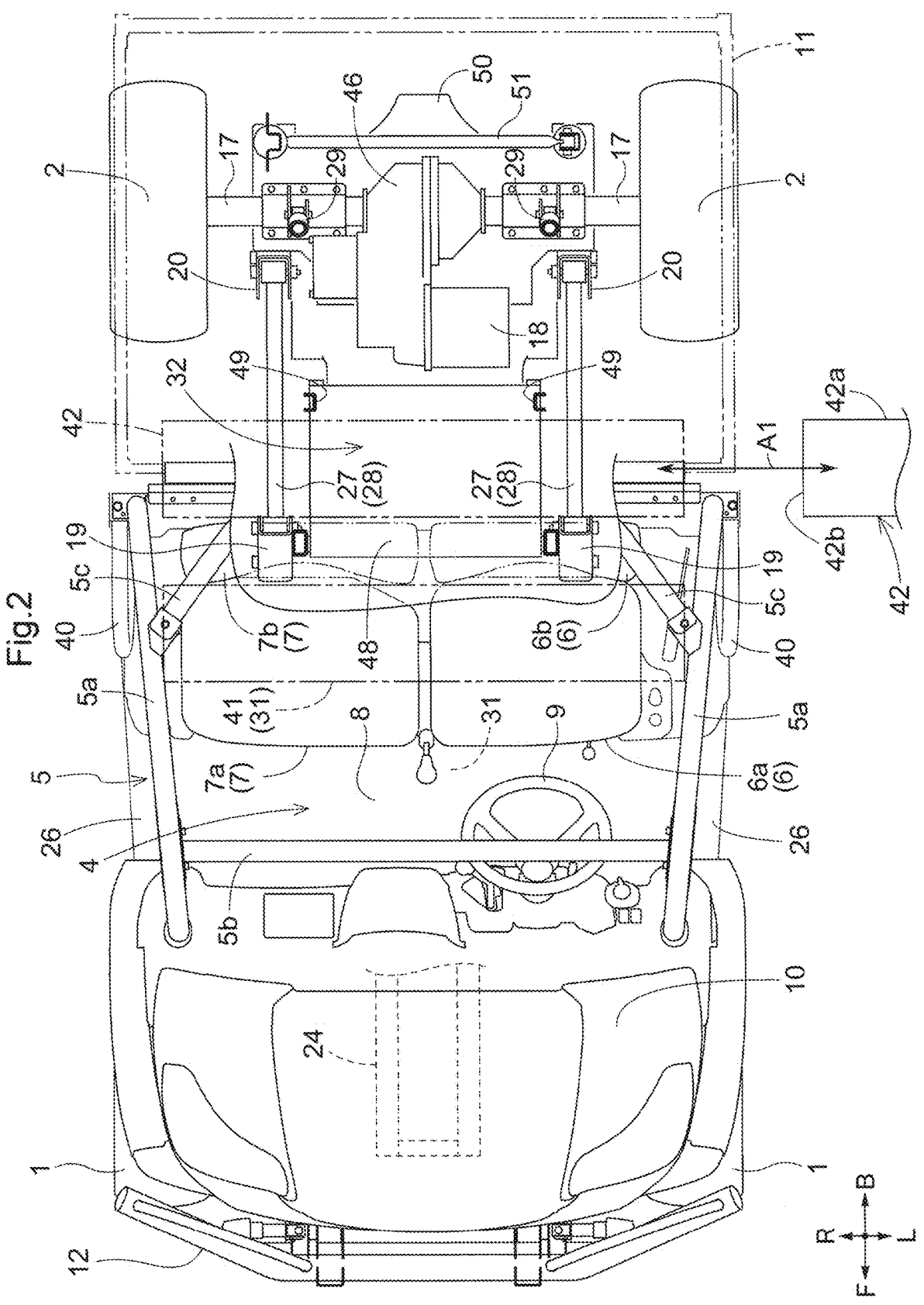
FIG. 2 is a plan view of a work vehicle.

As illustrated in FIGS. 1 and 2, the work vehicle includes left and right travel front wheels 1, left and right travel rear wheels 2, and a body frame 3. The front wheels 1 (which correspond to the "travel device") are at a front portion of the body frame 3. The rear wheels 2 (which correspond to the "travel device") are at a back portion of the body frame 3. The body frame 3 is supported by the front and rear wheels 1 and 2.

The work vehicle includes a driver section 4 and a roll-over protective structure (ROPS) frame 5 that defines the driver section 4. The driver section 4 is supported by a portion of the body frame 3 which portion is between the front wheels 1 and the rear wheels 2, and is configured to accommodate a driver and a worker. The driver section 4 includes a driver's seat 6 (which corresponds to the "seat"), a passenger's seat 7 (which corresponds to the "seat"), a floor 8, and a steering wheel 9 for changing the direction of the front wheels 1.

The work vehicle includes a hood 10 forward of the driver section 4 and a carrier box 11 backward of the driver section 4. The carrier box 11 is capable of being lifted and lowered into a use orientation (indicated with solid lines in FIG. 1) and a dumping orientation (indicated with double-dashed chain lines in FIG. 1), in which the carrier box 11 has a front portion lifted with a back lower portion as a pivot.

Configuration of Body Frame

As illustrated in FIGS. 1 to 4, the body frame 3 includes left and right first frame members 21, left and right second frame members 22, left and right third frame members 23, left and right fourth frame members 24, left and right fifth frame members 25, and left and right sixth frame members 26.

The first frame members 21 extend in the front-back direction under the driver section 4 (specifically, the floor 8). The second frame members 22 are each coupled to a back portion of the corresponding first frame member 21, extend upward therefrom, and are each backward of the driver section 4.

The third frame members 23 are each coupled to an upper portion of the corresponding second frame member 22, and extends backward therefrom. The third frame members 23 include respective upper portions on which the carrier box 11 is disposed in such a manner as to be capable of being lifted and lowered into the use orientation and the dumping orientation.

The fourth frame members 24 are each coupled to a front portion of the corresponding first frame member 21, and extend forward therefrom. The work vehicle includes left and right vertical frame members 30 each coupled to the front portion of the corresponding first frame member 21 and extending upward therefrom.

The fifth frame members 25 are each coupled to an upper portion of the corresponding frame member 30, and extend forward therefrom. The work vehicle includes left and right front guards 12 each coupled to respective front portions of the corresponding fourth and fifth frame members 24 and 25.

Figure 3:
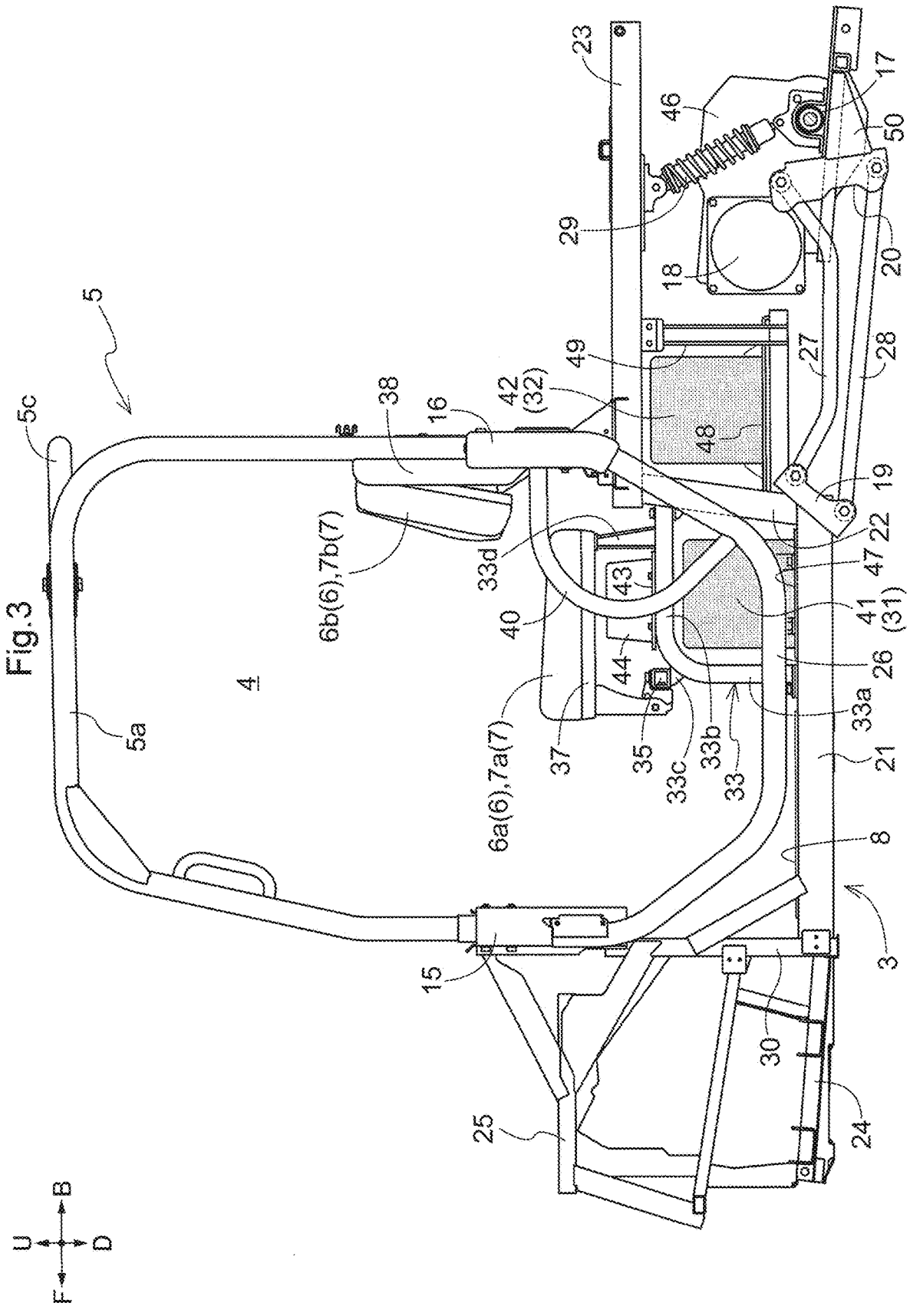
FIG. 3 is a left side view of members such as a body frame, a ROPS frame, a seat frame member, a first battery support section, and a second battery support section.
Figure 4:
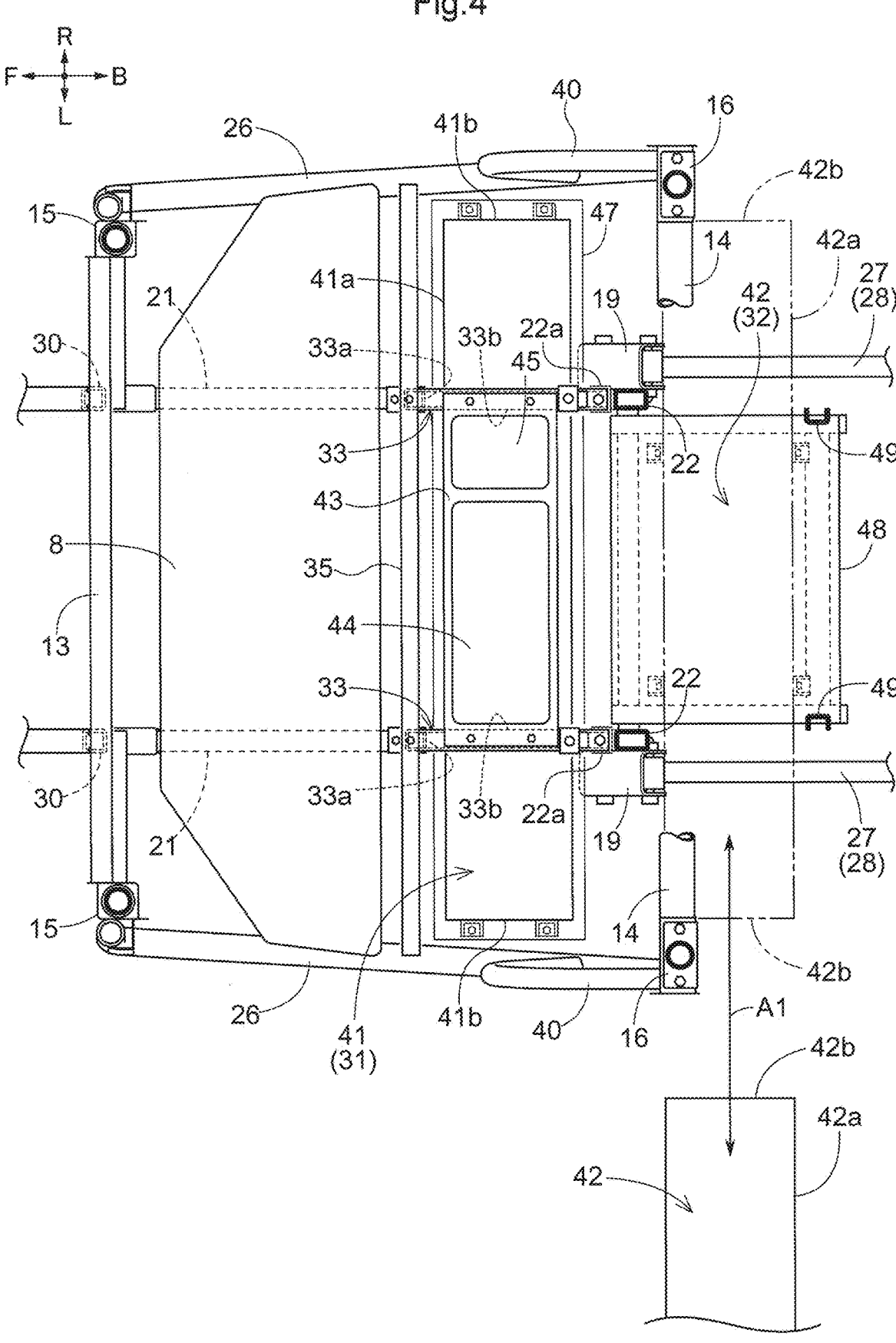
FIG. 4 is a plan view of members such as a body frame, seat frame members, a first battery support section, and a second battery support section.

As illustrated in FIGS. 3 and 4, the work vehicle includes left and right front supports 15 each coupled to the upper portion of the corresponding frame member 30, a frame member 13 coupled to the front supports 15, a frame member 14 coupled to respective front portions of the third frame members 23, and left and right back supports 16 coupled respectively to left and right portions of the frame member 14.

The sixth frame members 26 are each in a U shape (that is, a channel shape) in a side view, and each include a front upper portion coupled to the corresponding front support 15 and a back upper portion coupled to the corresponding back support 16. The floor 8 is coupled to respective front portions of the first frame members 21 and respective front lower portions of the sixth frame members 26. The work vehicle includes left and right side guards 40 each coupled to the corresponding back support 16 and to a back lower portion of the corresponding sixth frame member 26.

With the above configuration, the work vehicle includes front wheels 1 ("travel device", "front travel device"), rear wheels 2 ("travel device", "rear travel device"), and a driver section 4 including a driver's seat 6 ("seat") and a passenger's seat 7 ("seat") and disposed between the front wheels 1 ("front travel device") and the rear wheels 2 ("rear travel device") in a side view.

The work vehicle includes a body frame 3 provided with the front wheels 1 ("travel device") and the rear wheels 2 ("travel device") and supporting the driver section 4. The body frame 3 includes first frame members 21, second frame members 22, and third frame members 23. The first frame members 21 are under the driver section 4. The second frame members 22 each extend upward from a back portion of the corresponding first frame member 21, and are backward of the driver section 4. The third frame members 23 each extend backward from an upper portion of the corresponding second frame member 22. The work vehicle includes a carrier box 11 over the third frame members 23.

Structure for Mounting Rear Wheels

As illustrated in FIGS. 1, 2, and 3, the body frame 3 is provided with left and right attachment sections 19 each coupled to a portion at which a back portion of the corresponding first frame member 21 is coupled to a lower portion of the corresponding second frame member 22. The work vehicle includes left and right suspension links 27 and left and right suspension links 28 each attached to the corresponding attachment section 19 in a vertically swingable manner and each extending backward from the corresponding attachment section 19.

The work vehicle includes an axle frame 50 and a rear axle case 17 coupled to the axle frame 50 and including left and right portions each supporting the corresponding rear wheel 2. The work vehicle includes left and right attachment sections 20 coupled respectively to the left and right portions of the axle frame 50. The suspension links 27 and 28 each include a back portion attached to the corresponding attachment section 20 in a vertically swingable manner.

The work vehicle includes a lateral rod 51 connected to a back portion of the right third frame member 23 and to the axle frame 50. The lateral rod 51 allows the axle frame 50 (and the rear axle case 17) to move vertically and prevents the axle frame 50 (and the rear axle case 17) from moving laterally.

The suspension links 27 and 28 and the lateral rod 51 form a five-link mechanism that allows the axle frame 50 (and the rear axle case 17) to be supported by the body frame 3 in a vertically movable manner.

The work vehicle includes left and right suspension mechanisms 29 each including a suspension spring and a damper. The right suspension mechanism 29 is connected to the right third frame member 23 and to a right portion of the rear axle case 17, whereas the left suspension mechanism 29 is connected to the left third frame member 23 and to a left portion of the rear axle case 17. The suspension mechanisms 29 are thus coupled to the suspension links 27 and 28 with the axle frame 50 and the rear axle case 17 in-between.

Structure for Driving Rear Wheels

As illustrated in FIGS. 1, 2, and 3, the work vehicle includes an auxiliary transmission device 46 coupled to an upper portion of a laterally central portion of the rear axle case 17 and a motor 18 coupled to a front portion of the auxiliary transmission device 46. The motor 18 is forward and upward relative to the rear axle case 17 (and the rear wheels 2) in a side view.

The rear wheels 2, the motor 18, and the auxiliary transmission device 46 are thus supported by respective back portions of the suspension links 27 and 28 with the axle frame 50 and the rear axle case 17 in-between.

The motor 18 transmits motive power to the auxiliary transmission device 46, which varies the motive power and transmits the varied motive power to the rear wheels 2 through a rear-wheel differential device (not illustrated in the drawings) and a drive shaft (not illustrated in the drawings) inside the rear axle case 17.

Configuration of ROPS Frame

As illustrated in FIGS. 2 and 3, the ROPS frame 5 includes left and right first portions 5a, a second portion 5b, and a third portion 5c.

The first portions 5a are each in the shape of an inverted U (that is, an inverted channel) in a side view. The second portion 5b is coupled to respective front portions of the first portions 5a. The third portion 5c is coupled to respective back portions of the first portions 5a.

The first portions 5a each include a front lower portion coupled to the corresponding front support 15 with use of a bolt (not illustrated in the drawings), whereas the first portions 5a each include a back lower portion coupled to the corresponding back support 16 with use of a bolt (not illustrated in the drawings). The ROPS frame 5 is attached to the body frame 3 as described above.

Removing the front lower portion of each first portion 5a from the corresponding front support 15 and the back lower portion of each first portion 5a from the corresponding back support 16 allows the ROPS frame 5 to be removed from the body frame 3.

Figure 5:
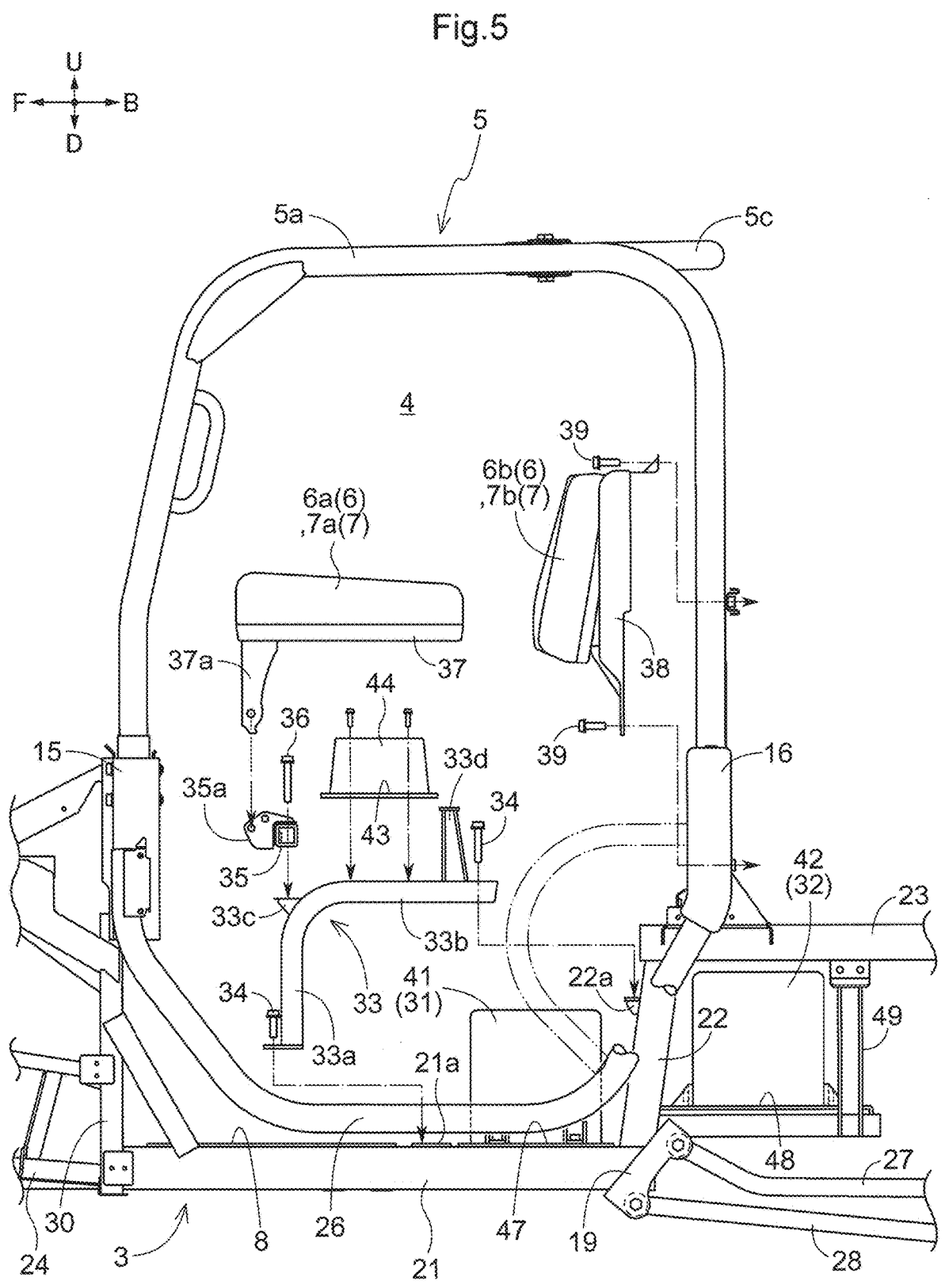
FIG. 5 is an exploded left side view of members such as a body frame, a ROPS frame, a seat frame member, a first battery support section, and a second battery support section.

Configuration of Seat Frame Members Supporting Driver's Seat and Passenger's Seat As illustrated in FIGS. 3, 4, and 5, the work vehicle includes left and right seat frame members 33. The seat frame members 33 are each in the form of an angular pipe bent in an L shape, and each include an up-down portion 33a extending in the up-down direction and a front-back portion 33b extending backward from an upper portion of the up-down portion 33a.

The seat frame members 33 include a support 33c coupled to the respective upper portions of the up-down portions 33a (or respective front portions of the front-back portions 33b) and a support 33d coupled to respective back portions of the front-back portions 33b.

The body frame 3 is configured such that the first frame members 21 each include a back portion provided with an attachment section 21a and that the second frame members 22 each include an upper portion provided with an attachment section 22a.

The seat frame members 33 are configured such that the up-down portions 33a each include a lower portion attachable to the corresponding attachment section 21a with use of a bolt 34 and detachable therefrom and that the front-back portions 33b each include a back portion attachable to the corresponding attachment section 22a with use of a bolt 34 and detachable therefrom.

How Driver's Seat And Passenger's Seat Are Attached

As illustrated in FIGS. 3, 4, and 5, the work vehicle includes a support frame member 35 in the form of an angular pipe provided with pivot sections 35a. The support frame member 35 is attachable to the support 33c of each seat frame member 33 with use of a bolt 36 and detachable therefrom.

As illustrated in FIGS. 1 and 2, the driver's seat 6 includes a seating section 6a and a backrest 6b separate from the seating section 6a, whereas the passenger's seat 7 includes a seating section 7a and a backrest 7b separate from the seating section 7a.

As illustrated in FIGS. 3 and 5, the work vehicle includes a plate-shaped support member 37 provided with left and right legs 37a each under a front portion thereof. The seating sections 6a and 7a are attached to the support member 37. The legs 37a are each attached to a pivot section 35a in such a manner that the support member 37 is swingable about an axis extending in the left-right direction A1.

The work vehicle includes a plate-shaped support member 38 to which the backrests 6b and 7b are attached and which is attachable to each first portion 5a of the ROPS frame 5 with use of a bolt 39 and detachable therefrom.

With the work vehicle in normal use, the support member 37 has a front portion supported by the seat frame members 33 with the support frame member 35 in-between and a back portion supported by the support 33d of the seat frame members 33.

With the work vehicle in normal use, the seating sections 6a and 7a are supported by the respective seat frame members 33, and thereby supported by the body frame 3 with the seat frame members 33 in-between. With the work vehicle in normal use, the backrests 6b and 7a are supported by the ROPS frame 5, and thereby supported by the body frame 3 with the ROPS frame 5 in-between.

Lifting a back portion of the support member 37 with each pivot section 35a on the support frame member 35 as a pivot creates an open space over the seat frame members 33. Removing each bolt 36 and removing the support frame member 35 from the seat frame members 33 allows the seating sections 6a and 7a to be removed from the seat frame members 33.

Removing each bolt 39 and removing the support member 38 from the ROPS frame 5 allows the backrests 6b and 7b to be removed from the ROPS frame 5 (that is, from the body frame 3).

Configuration of First Battery Support

As illustrated in FIGS. 3, 4, and 5, the body frame 3 is provided with a plate-shaped support member 47 coupled to respective back portions of the first frame members 21.

The body frame 3 has a quadrangular space in a side view as defined by (i) the up-down portions 33a, that is, those portions of the seat frame members 33 which extend in the up-down direction, (ii) the front-back portions 33b, that is, those portions of the seat frame members 33 which extend horizontally (or the respective seating sections 6a and 7a of the driver's seat 6 and the passenger's seat 7), (iii) the horizontal first frame members 21 (or the support member 47), and (iv) the second frame members 22, which extend in the up-down direction. The space serves as a first battery support section 31.

With the above configuration, the work vehicle includes under the driver's seat 6 ("seat") and the passenger's seat 7 ("seat") a first battery support section 31 in which to mount a battery 41 ("first battery").

Configuration of First Battery

As illustrated in FIGS. 3, 4, and 5, the battery 41 (which corresponds to the "first battery") is attachable to the support member 47 with use of bolts (not illustrated in the drawings) and detachable therefrom. The battery 41 is mounted in the first battery support section 31.

The battery 41 is, in a plan view, in the shape of a rectangle with long sides 41a and short sides 41b. The battery 41 as mounted in the first battery support section 31 has long sides 41a in the left-right direction A1.

The battery 41 as mounted in the first battery support section 31 is, in a side view, between the up-down portion 33a of each seat frame member 33 and the corresponding second frame member 22 and between the front-back portion 33b of each seat frame member 33 and the corresponding first frame member 21.

The right short side 41b is, in a plan view, to the right of the right seat frame member 33 and toward the lateral center of the body frame 3 relative to the right sixth frame member 26 and the right side guard 40. The right short side 41b, in a side view, overlaps with the right sixth frame member 26 and the right side guard 40.

The left short side 41b is, in a plan view, to the left of the left seat frame member 33 and toward the lateral center of the body frame 3 relative to the left sixth frame member 26 and the left side guard 40. The left short side 41*b*, in a side view, overlaps with the left sixth frame member 26 and the left side guard 40.

Configuration of Inverter and Controller

As illustrated in FIGS. 3, 4, and 5, the work vehicle includes a plate-shaped support member 43 attachable to the respective front-back portions 33*b* of the seat frame members 33 each with use of a bolt (not illustrated in the drawings) and detachable therefrom. The work vehicle includes an inverter 44 and a controller 45 both attached to the support member 43 and disposed, in a side view, between (i) the respective seating sections 6*a* and 7*a* of the driver's seat 6 and the passenger's seat 7 (or the support member 37) and (ii) the first battery support section 31 (or the respective front-back portions 33*b* of the seat frame members 33).

In response to a driver on the driver's seat 6 pressing a shift pedal (not illustrated in the drawings), the controller 45 receives information on the position of the shift pedal as pressed and operates the inverter 44 on the basis of the position.

The inverter 44 converts direct-current electric power from the battery 41 and a battery 42 (described later) into alternating-current electric power and supplies the alternating-current electric power to the motor 18. The motor 18, in response, operates to generate travel motive power and supplies the travel motive power to the rear wheels 2 as mentioned above.

With the above configuration, the work vehicle includes batteries 41 and 42 and a motor 18 configured to generate motive power on the basis of electric power from the batteries 41 and 42 and supply the motive power to the rear wheels 2 ("travel device").

How to Maintain First Battery and Inverter

As illustrated in FIGS. 3, 4, and 5, lifting a back portion of the support member 37 with each pivot section 35*a* on the support frame member 35 as a pivot creates an open space over the seat frame members 33 as mentioned above.

Lifting the support member 37 allows the inverter 44 and the controller 45 to be maintained. Removing the support member 43 from the seat frame members 33 removes the inverter 44 and the controller 45. Lifting the support member 37 and removing the inverter 44 and the controller 45 allows the battery 41 to be maintained.

Removing the support frame member 35 from the seat frame members 33 and removing the respective seating sections 6*a* and 7*a* of the driver's seat 6 and the passenger's seat 7 from the seat frame members 33 as mentioned above allows the bolts 34 to be removed and the seat frame members 33 to be removed from the body frame 3 (specifically, from the first frame members 21 and the second frame members 22).

Removing the seat frame members 33 from the body frame 3 (specifically, from the first frame members 21 and the second frame members 22) allows the battery 41 to be removed from and mounted in the first battery support section 31.

Removing the bolts 39, removing the support member 38 from the ROPS frame 5, and removing the backrests 6*b* and 7*b* from the ROPS frame 5 (that is, from the body frame 3) as mentioned above further facilitates mounting and removing the battery 41.

In addition to removing the backrests 6*b* and 7*b* from the ROPS frame 5 (that is, from the body frame 3), removing the front lower portion of each first portion 5*a* from the corresponding front support 15, removing the back lower portion of each first portion 5*a* from the corresponding back support

16, and removing the ROPS frame 5 from the body frame 3 as mentioned above further facilitates mounting and removing the battery 41.

Configuration of Second Battery Support

As illustrated in FIGS. 3, 4, and 5, the body frame 3 is provided with a plate-shaped support base 48 coupled to respective lower portions of the second frame members 22 (which lower portions are proximate to the respective attachment sections 19) and extending backward from the second frame members 22.

The work vehicle includes a right support frame member 49 coupled to the right third frame member 23 and to a back right portion of the support base 48 and a left support frame member 49 coupled to the left third frame member 23 and to a back left portion of the support base 48.

The body frame 3 has a quadrangular space in a side view as defined by (i) the second frame members 22, which extend in the up-down direction, (ii) the horizontal third frame members 23, (iii) the horizontal support base 48, and (iv) the support frame members 49, which extend in the up-down direction. The space serves as a second battery support section 32 (which corresponds to the "battery support section").

The support base 48 and the support frame members 49 are above the upper suspension links 27, which are each curved downward in a side view, and between the suspension links 27 and between the suspension links 28 in a plan view.

The support base 48 and the support frame member 49 are forward of the motor 18, the auxiliary transmission device 46, the rear axle case 17, and the suspension mechanisms 29 in a side view. The battery 42 (which corresponds to the "second battery") is attachable to and detachable from the support base 48 as described later.

With the above configuration, the work vehicle includes a second battery support section 32 ("battery support section") in which the battery 42 ("second battery") is mountable and from which the battery 42 is removable.

The driver section 4 is, in a side view, between the front wheels 1 ("front travel device") and the rear wheels 2 ("rear travel device"). The second battery support section 32 ("battery support section") is, in a side view, between the driver section 4 and the rear wheels 2 ("rear travel device").

The motor 18 is, in a side view, between the driver section 4 and the rear wheels 2 ("rear travel device"). The second battery support section 32 ("battery support section") is, in a side view, between the driver section 4 and the motor 18.

The second battery support section 32 ("battery support section") is below the respective seating sections 6*a* and 7*a* ("seat") of the driver's seat 6 and the passenger's seat 7.

The second battery support section 32 ("battery support section") is backward of the second frame members 22 of the body frame 3 and below the third frame members 23 of the body frame 3.

The second battery support section 32 ("battery support section") includes a support base 48 and support frame members 49 coupled to the respective third frame members 23 and the support base 48. The support base 48 is coupled to respective back portions of the first frame members 21 of the body frame 3 or to the respective second frame members 22, and extends backward. The battery 42 ("second battery") is attachable to the support base 48.

The work vehicle includes suspension links 27 and 28 held by respective back portions of the first frame members 21 or respective lower portions of the second frame members 22 in a vertically swingable manner and extending backward below the second battery support section 32 ("battery support section") in a side view.

The work vehicle includes suspension mechanisms 29 backward of the second battery support section 32 ("battery support section"), connected to the respective third frame members 23, and coupled to the respective suspension links 27 and the respective suspension links 28. The rear wheels 2 ("rear travel device") are each held by respective back portions of the corresponding suspension links 27 and 28.

Configuration of Second Battery

As illustrated in FIGS. 3, 4, and 5, the battery 42 (which corresponds to the "second battery") is attachable to the support base 48 with use of bolts (not illustrated in the drawings) and detachable therefrom. The battery 42 is mounted in the second battery support section 32.

The battery 42 is, in a plan view, in the shape of a rectangle with long sides 42a and short sides 42b. The battery 42 as mounted in the second battery support section 32 has long sides 42a in the left-right direction A1.

The battery 42 is identical to the battery 41: The long sides 42a are equal in dimension to the long sides 41a, whereas the short sides 42b are equal in dimension to the short sides 41b.

The battery 42 as mounted in the second battery support section 32 is, in a side view, between each third frame member 23 of the body frame 3 and the support base 48 and between each second frame member 22 of the body frame 3 and the corresponding support frame member 49.

The right short side 42b is, in a plan view, to the right of a right portion of the support base 48 and the right support frame member 49 and toward the lateral center of the body frame 3 relative to the right sixth frame member 26 and the right side guard 40.

The left short side 42b is, in a plan view, to the left of a left portion of the support base 48 and the left support frame member 49 and toward the lateral center of the body frame 3 relative to the left sixth frame member 26 and the left side guard 40.

How to Mount Second Battery

As illustrated in FIGS. 2 and 4, to mount the battery 42 in the second battery support section 32, a worker places the battery 42 on a cart (not illustrated in the drawings) with a height substantially equal to the height of the second battery support section 32 (specifically, of the support base 48).

The worker then places the cart (or the battery 42) to the left of the second battery support section 32 and orients the cart so that the long sides 42a are in the left-right direction A1. The worker then moves the cart (or the battery 42) to the right in the left-right direction A1 toward the second battery support section 32 until the cart (or the battery 42) comes into contact with, for example, the body frame 3 and stops.

The worker then moves the battery 42 from the cart to the right in the left-right direction A1 to insert the right short side 42b into the second battery support section 32 and move the battery 42 further to the right, thereby moving the battery 42 from the cart onto the support base 48. The worker can bolt the battery 42 to the support base 48 to mount the battery 42 in the second battery support section 32.

If a worker places the cart (or the battery 42) to the right of the second battery support section 32, the worker can similarly orient the cart so that the long sides 42a are in the left-right direction A1 and move the cart (or the battery 42) to the left in the left-right direction A1 toward the second battery support section 32 to mount the battery 42 in the second battery support section 32.

How to Remove Second Battery

As illustrated in FIGS. 2 and 4, to remove the battery 42 from the second battery support section 32, a worker places an empty cart to the left of the second battery support section 32.

The worker removes the bolts with which the battery 42 is attached to the support base 48, and then moves the battery 42 to the left in the left-right direction A1 to place the left short side 42b onto the cart. The worker then moves the battery 42 further to the left to move the battery 42 from the support base 48 onto the cart, thereby removing the battery 42 from the second battery support section 32.

If a worker places an empty cart to the right of the second battery support section 32, the worker similarly moves the battery 42 to the right in the left-right direction A1 to move the battery 42 from the support base 48 onto the cart, thereby removing the battery 42 from the second battery support section 32.

With the above configuration, moving the battery 42 ("second battery") from the left or right of the second battery support section 32 ("battery support section") in the left-right direction A1 allows the battery 42 to be mounting in the second battery support section 32 ("battery support section"), whereas moving the battery 42 from the second battery support section 32 ("battery support section") to the left or right in the left-right direction A1 allows the battery 42 to be removed from the second battery support section 32 ("battery support section").

First Alternative Embodiment

If the work vehicle does not include a battery 42 in the second battery support section 32, the second battery support section 32 is usable as, for example, a space for storing tools and baggage.

The work vehicle may, in this case, include in the second battery support section 32 a storage box (not illustrated in the drawings) with a door. Storing tools and baggage in the storage box prevents the tools and baggage from falling onto the ground due to, for example, vibration during travel, and protects the tools and baggage from soil or water on the ground.

Second Alternative Embodiment

The work vehicle may include left and right under covers (not illustrated in the drawings) coupled respectively to left and right portions of the support base 48 and configured to protect the battery 42 in the second battery support section 32 from soil or water on the ground.

Third Alternative Embodiment

The second alternative embodiment may be further altered such that the work vehicle includes left and right side covers (not illustrated in the drawings) disposed respectively at a left portion of the left under cover and a right portion of the right under cover and configured to be opened and closed. With this configuration, the side covers protect left and right portions of the battery 42 in the second battery support section 32.

Fourth Alternative Embodiment

The work vehicle may be configured such that the attachment sections 19 are each coupled to a back portion of the corresponding first frame member 21 and that the suspension links 27 and 28 are each held by the back portion of the corresponding first frame member 21 in a vertically swingable manner.

The work vehicle may be configured such that the attachment sections 19 are each coupled to a lower portion of the corresponding second frame member 22 and that the suspension links 27 and 28 are each held by the lower portion of the corresponding second frame member 22 in a vertically swingable manner.

Fifth Alternative Embodiment

The work vehicle may be configured such that the support base 48 is coupled to respective back portions of the first frame members 21 (which back portions are proximate to the respective attachment sections 19) and extends backward therefrom.

Sixth Alternative Embodiment

The work vehicle may omit the suspension links 27 and 28 and the lateral rod 51 and include a double wishbone suspension (not illustrated in the drawings) to allow the rear wheels 2 to be held by the respective third frame members 23 of the body frame 3.

The work vehicle may, in this case, be of a four-wheel drive such that the motor 18 transmits its motive power through a power transmission shaft (not illustrated in the drawings) and a front-wheel differential device (not illustrated in the drawings) to the front wheels 1.

Seventh Alternative Embodiment

The work vehicle may be configured such that the driver section 4 includes a driver's seat 6 and a passenger's seat 7 on the front row and an additional seat (not illustrated in the drawings) on the back row to accommodate four persons in total.

The work vehicle should, in this case, include a battery 41 under a backseat configured as illustrated in FIGS. 3, 4, and 5. If the batteries 41 and 42 alone are insufficient in terms of capacity, the work vehicle should include an additional battery under the driver's seat 6 and the passenger's seat 7.

Eighth Alternative Embodiment

The work vehicle may include a crawler travel device (not illustrated in the drawings) in place of the front wheels 1 as the front travel device or in place of the rear wheels 2 as the rear travel device. The work vehicle may include a single crawler travel device (not illustrated in the drawings) in place of both the front wheels 1 and the rear wheels 2.

Industrial Applicability

The present invention is applicable to not only an electrically operated work vehicle including a motor configured to drive its travel device, but also a hybrid work vehicle including an engine and a motor each configured to drive its travel device.

REFERENCE SIGNS LIST

1 Front wheel (travel device)
2 Rear wheel (travel device)
3 Body frame
4 Driver section
6 Driver's seat (seat)
7 Passenger's seat (seat)
11 Carrier box
18 Motor
21 First frame member
22 Second frame member
23 Third frame member
27 Suspension link
28 Suspension link
29 Suspension mechanism
32 Second battery support section (battery support section)
42 Battery
42a Long side
42b Short side
48 Support base
49 Support frame member
A1 Left-right direction

The invention claimed is:
1. A work vehicle, comprising:
at least one travel device;
a driver section including a seat;
a battery;
an inverter;
a motor configured to supply motive power to the at least one travel device with use of electric power from the battery; and
a battery support section in which the battery is mountable and from which the battery is removable,
wherein moving the battery from left or right of the battery support section in a left-right direction relative to a vehicle width direction allows the battery to be mounted in the battery support section,
wherein moving the battery from the battery support section to the left or right of the battery support section in the left-right direction relative to the vehicle width direction allows the battery to be removed from the battery support section, and
wherein the inverter is between the seat and the battery support section in a side view.
2. The work vehicle according to claim 1, wherein:
the at least one travel device comprises a front travel device and a rear travel device,
the driver section is between the front travel device and the rear travel device in the side view, and
the battery support section is between the driver section and the rear travel device in the side view.
3. The work vehicle according to claim 2, wherein:
the motor is between the driver section and the rear travel device in the side view, and
the battery support section is between the driver section and the motor in the side view.
4. The work vehicle according to claim 2, wherein:
the battery support section is below the seat.
5. The work vehicle according to claim 1, further comprising:
a body frame for which the at least one travel device is provided and which supports the driver section, and
wherein the body frame comprises:
a first frame member under the driver section;
a second frame member extending upward from a back portion of the first frame member and disposed backward of the driver section; and
a third frame member extending backward from an upper portion of the second frame member, and wherein the battery support section is backward of the second frame member and below the third frame member.

6. The work vehicle according to claim 5, wherein:

the battery support section comprises:

a support base coupled to the back portion of the first frame member or to the second frame member and extending backward, to which support base the battery is attachable; and a support frame member coupled to the third frame member and the support base.

7. The work vehicle according to claim 5, further comprising:

a carrier box over the third frame member.

8. The work vehicle according to claim 5, further comprising:

a suspension link held by the back portion of the first frame member or a lower portion of the second frame member in a vertically swingable manner and extending backward below the battery support section in a side view; and a suspension mechanism backward of the battery support section and coupled to the third frame member and the suspension link, and wherein a rear travel device is held by a back portion of the suspension link.

9. The work vehicle according to claim 1, wherein:

the battery is in a shape of a rectangle with a long side and a short side in a plan view, and the battery is mountable in the battery support section with the long side in the left-right direction relative to the vehicle width direction.

\* \* \* \* \*